United States Patent [19]

Gruffaz et al.

[11] 4,085,164
[45] Apr. 18, 1978

[54] THERMOSETTING COMPOSITIONS BASED ON A BIS-IMIDE AND A POLYURETHANE

[75] Inventors: Max Gruffaz, La Mulatiere; Jean Louis Locatelli, Vienne, both of France

[73] Assignee: Rhone-Poulenc Industries, Paris, France

[21] Appl. No.: 623,425

[22] Filed: Oct. 17, 1975

[30] Foreign Application Priority Data

Oct. 21, 1974 France ................ 74 35311

[51] Int. Cl.$^2$ .................. C08G 18/83; C08L 75/06
[52] U.S. Cl. ................ 260/858; 260/75 NA; 260/77.5 A; 260/77.5 R
[58] Field of Search ............ 260/77.5 A, 75 NA, 858, 260/77.5 R

[56] References Cited

U.S. PATENT DOCUMENTS

| | | | |
|---|---|---|---|
| 2,906,738 | 9/1959 | Goldberg ........................ | 260/77.5 |
| 3,729,446 | 4/1973 | Holub et al. ..................... | 260/47 CZ |
| 3,730,948 | 5/1973 | Akiyama et al. ................ | 260/47 EC |

OTHER PUBLICATIONS

Saunders et al., Polyurethanes Part I, Interscience, New York (1962) pp. 273–314.
Encyclopedia of Polymer Science and Technology, vol. 11, Interscience, New York (1969) p. 548.

*Primary Examiner*—H.S. Cockeram
*Attorney, Agent, or Firm*—Stevens, Davis, Miller & Mosher

[57] ABSTRACT

A curable composition is provided which comprises
A. an imide group-containing compound which is either
  a. a bis-imide of the formula

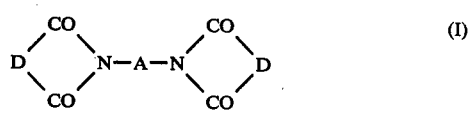

which D represents a radical of the formula

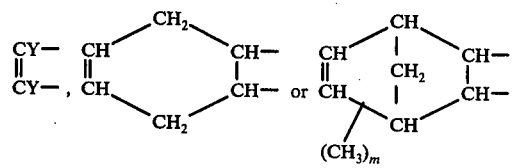

in which Y represents H, CH$_3$ or Cl, $m$ is 0 or 1, and A represents a divalent organic radical containing 2 to 30 carbon atoms, or
  b. a mixture comprising a bis-imide of formula (I) and a mono-imide of the formula

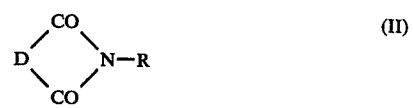

in which D is as defined above and R represents a hydrogen atom or a monovalent organic radical containing from 1 to 20 carbon atoms; and
B. a polyurethane elastomer, in amounts such that the weight ratio $$\frac{\text{polyurethane}}{\text{compound with imide groups}}$$

is from 1/5 to 4/1. Such compositions are useful for preparing moulded articles, adhesives, laminates and coatings.

11 Claims, No Drawings

THERMOSETTING COMPOSITIONS BASED ON A BIS-IMIDE AND A POLYURETHANE

The present invention relates to curable compositions based on compounds with imide groups and a polyurethane.

U.S. Pat. No. 2,906,738 describes a process for the crosslinking of polytetrahydrofurane or of copolymers of tetrahydrofurane with polyurethanes derived from poly (oxytetramethylene)glycols, in which a compound which generates free radicals, such as an organic peroxide and, as an acceptor of free radicals, a N,N'-substituted bis-maleimide are incorporated into the polymer. It emerges from this patent that optimum results are obtained by using from 1 to 6% by weight of bis-maleimide relative to the weight of the polymer.

U.S. Pat. No. 2,965,553 describes a process for the crosslinking of a variety of high molecular weight polymers, especially polyurethanes, in which from 0.5 to 6%, relative to the weight of the polymer, of a N,N'-substituted bis-maleimide is incorporated into the polymer, and the composition is subjected to ionising radiation.

Kovacic (J. Amer. Chem. Soc. 81, 1959, pages 1,188 - 1,189) has also shown that the use of a small amount of a bis-maleimide, of the order to 2 to 3%, makes it possible to reduce the amount of peroxide usually required to crosslink a polyurethane.

U.S. Pat. No. 3,012,993 states that it is possible to crosslink a polyurethane containing conjugated double bonds by carrying out a Diels-Alder reaction using a bis-maleimide. It emerges from this patent that the amount of bis-maleimide can be greater than the stoichiometric amount required by the reaction but, relative to the weight of the polymer, the amount of bis-maleimide is always within the range mentioned above.

The crosslinking of a polyurethane is also described in French Pat. No. 1,580,034 which states that, above all when crosslinking is produced by irradiation, it is possible to incorporate into the polymer one or more monomers which will form bridges between the polyurethane chains; N,N'-hexamethylene-bis-maleimide is mentioned amongst these monomers. It is stated that the amount of peroxide or of crosslinking agent is generally between 0.5 and 4% of the weight of the polyurethane.

It thus appears that heretofore, a bis-maleimide has been used essentially for the purpose of crosslinking certain polyurethanes, the use of the bis-maleimide making it possible to reduce the amount of peroxide (Kovacic, loc. cit., U.S. Pat. No. 2,906,738), to increase the degree of crosslinking as compared to the use of radiation alone (U.S. Pat. No. 2,965,553 or French Pat. No. 1,580,034) or to regulate the degree of crosslinking (U.S. Pat. No. 3,012,993) without significantly modifying the properties of the polymers when crosslinking is carried out in accordance with the conventional methods. In particular, these polymers, as a general rule, preserve their elastomeric properties.

It has now been found, according to the present invention, that it is possible to obtain compositions which are thermosetting, the properties of which can be modified extensively if a polyurethane is combined with an amount of a maleimide which is very much greater than the amount generally used for crosslinking the polyurethane.

According to the present invention there is provided a thermosetting composition which comprises:

A. An imide-group containing compound chosen from the group consisting of:
a. a bis-imide of the formula:

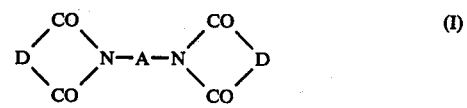

in which the symbol D represents a divalent radical chosen from radicals of the formula:

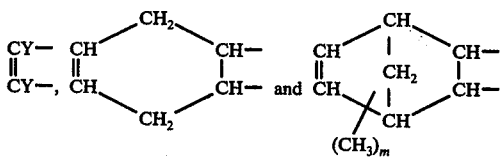

wherein Y represents H, $CH_3$ or Cl and $m$ is 0 or 1, and A represents a divalent organic radical containing 2 to 30 carbon atoms, or b. a mixture comprising a bis-imide of formula (I) and a mono-imide of the formula:

in which D is as defined above and R represents a hydrogen atom or a monovalent radical containing from 1 to 20 carbon atoms; and B. a polyurethane elastomer, the amounts of each of the constituents being such that the weight ratio $$\frac{\text{polyurethane}}{\text{compound with imide groups}}$$

is from 1/5 to 4/1.

In formula (I), A can, for example, represent a linear alkylene radical having less than 13 carbon atoms, a phenylene or cyclohexylene radical or

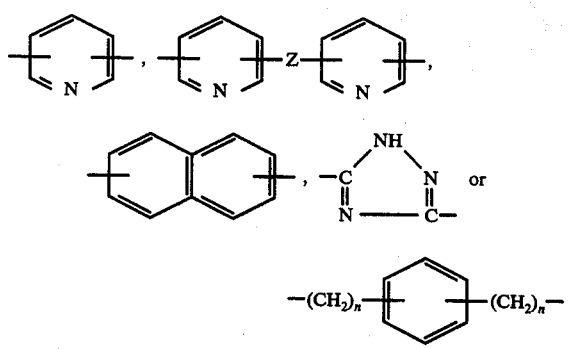

wherein $n$ represents an integer from 1 to 3 and Z represents a valency bond or an alkylene radical containing less than 13 carbon atoms. The symbol A can also comprise several alkylene radicals linked to one another by an atom or group such as —O— or —$NR_1$—, or several phenylene or cyclohexylene radicals linked to one another by a simple valency bond or by an inert atom or group such as —O—, —S—, an alkylene group having from 1 to 3 carbon atoms, —CO—, —$SO_2$—, —$NR_1$—,

—N═N—, —CONH—, —COO—, —P(O)R₁, —CONH—X—NHCO—,

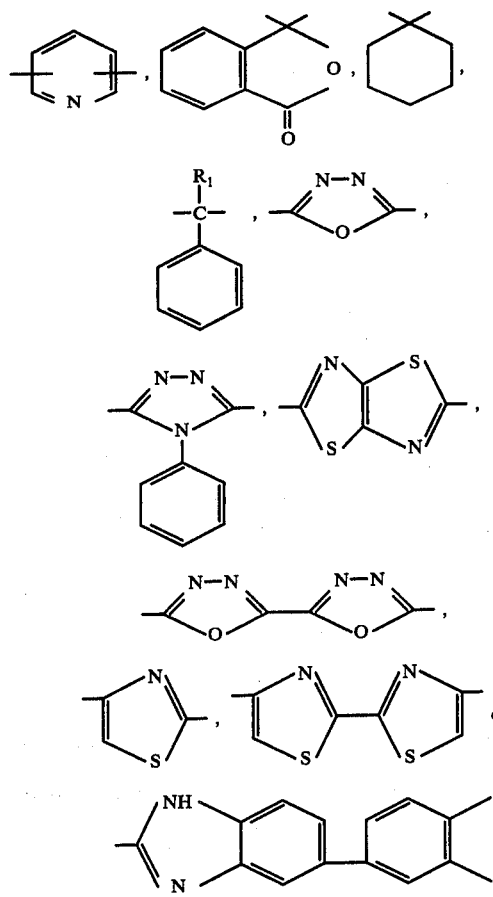

wherein R₁ represents a hydrogen atom, an alkyl radical having from 1 to 4 carbon atoms, phenyl or cyclohexyl and X represents an alkylene radical having less than 13 carbon atoms. The various phenylene or cyclohexylene radicals can be substituted by groups such as CH₃ or OCH₃ or by a chlorine atom.

Specific examples of bis-imides which can be used include: N,N'-ethylene-bis-maleimide, N,N'-metaphenylene-bis-maleimide, N,N'-hexamethylene-bis-maleimide, N,N'-para-phenylene-bis-maleimide, N,N'-4,4'-biphenylylene-bis-maleimide, N,N'-4,4'-diphenylmethane-bis-maleimide, N,N'-4,4'-diphenylmethane-bis-tetrahydrophthalimide, N,N'-4,4'-diphenyl ether-bis-maleimide, N,N'-4,4'-diphenyl sulphide-bis-maleimide, N,N'-4,4'-diphenyl sulphone-bis-maleimide, N,N'-4,4'-dicyclohexylmethane-bis-maleimide, N,N'-α,α'-4,4'-dimethylene-cyclohexane-bis-maleimide, N,N'-meta-xylylene-bis-maleimide, N,N'-paraxylylene-bis-maleimide, N,N'-4,4'-diphenyl-1,1-cyclohexane-bis-maleimide, N,N'-4,4'-diphenylmethane-bis-citraconimide, N,N'-4,4'-diphenyl ether-bis-endomethylenetetrahydrophthalimide, N,N'-4,4'-diphenylmethane-bis-chloromaleimide, N,N'-4,4'-(2,2-diphenyl-propane)-bis-maleimide, N,N'-4,4'-(1,1,1-triphenylethane)-bis-maleimide, N,N'-4,4'-triphenylmethane-bis-maleimide, N,N'-3,5-(1,2,4-triazole)-bis-maleimide, N,N'-dodecamethylene-bis-maleimide, N,N'-2,2,4-trimethylhexamethylene-bis-maleimide, 1,2-bis-(2-maleimido-ethoxy)-ethane, 1,3-bis-(3-maleimido-propoxy)-propane, N,N'-4,4'-benzophenone-bis-maleimide, N,N'-pyridine-2,6-diyl-bis-maleimide, N,N'-1,5-naphthylene-bis-maleimide, N,N'-1,4-cyclohexylene-bis-maleimide, N,N'-5-methyl-1,3-phenylene-bis-maleimide and N,N'-5-methoxy-1,3-phenylene-bis-maleimide.

Amongst the bis-imides mentioned above, it is preferred to use those in which the radical represented by A in formula I consists of a phenylene or xylylene radical or two phenylene radicals linked directly or via —O—, —SO₂—, —S— or —CH₂—. These bis-imides can be prepared by applying the methods described in, for example, U.S. Pat. No. 3,018,290 and British Patent Specification No. 1,137,592.

In formula II, the symbol R can represent, for example, a linear or branched alkyl or alkenyl radical which can contain up to 20 carbon atoms, a cycloalkyl radical containing 5 to 6 carbon atoms in the ring, a monocyclic or bicyclic aryl radical or an aralkyl radical, containing up to 20 carbon atoms, one of the radicals

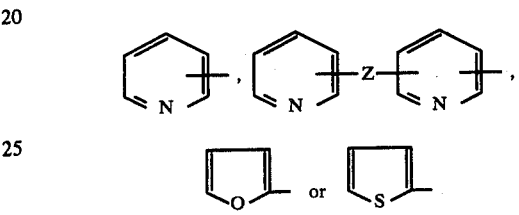

wherein Z has the meaning given above, or a monovalent radical consisting of a phenyl radical and a phenylene radical linked to one another by a simple valency bond or by an inert atom or group such as —O—, —S—, an alkylene radical having from 1 to 3 carbon atoms, —CO—, —SO₂—, —NR₁—, —N═N—, —CONH— or —COO—, wherein R₁ has the meaning given above. Furthermore, these various radicals can be substituted by one or more atoms, radicals or groups such as F, Cl, CH₃, OCH₃, OC₂H₅, OH, NO₂, —COOH, —NHCOCH₃ or

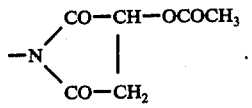

Specific examples of mono-imides which may be used include maleimide, N-phenylmaleimide, N-phenylmethylmaleimide, N-phenylchloromaleimide, N-p-chlorophenylmaleimide, N-p-methoxyphenyl-maleimide, N-p-methylphenylmaleimide, N-p-nitrophenylmaleimide, N-p-phenoxyphenylmaleimide, N-p-phenylaminophenylmaleimide, N-p-phenoxycarbonylphenylmaleimide, N-p-phenylcarbonylphenylmaleimide, 1-maleimido-4-acetoxysuccinimido-benzene, 4-maleimido-4'-acetoxysuccinimido-diphenylmethane, 4-maleimido-4'-acetoxysuccinimido-diphenyl ether, 4-maleimido-4'-acetamidodiphenyl ether, 2-maleimido-6-acetamido-pyridine, 4-maleimido-4'-acetamido-diphenylmethane, N-methylmaleimide, N-ethylmaleimide, N-vinylmaleimide, N-allylmaleimide, N-cyclohexylmaleimide and N-decylmaleimide. These mono-imides can be prepared by the methods described, for example, in U.S. Pat. Nos. 2,444,536 and 3,717,615 or in German Patent Application (DOS) No. 2,354,654.

If a mixture of a bis-imide of formula (I) and a mono-imide of formula (II) is employed, the number of imide groups introduced by the mono-imide generally represents up to 30% of the total number of imide groups introduced by the mixture.

The polyurethanes used in the compositions according to the invention are suitably polymers formed by reaction of a diisocyanate, a hydroxyl-terminated polymer, and a coupling agent. The hydroxylic polymer can be a linear polyester or a polyether.

Where a polyester-urethane is used, it is preferred to choose a starting polyester having a molecular weight from 1,000 to 12,000. This α,ω-dihydroxylic polyester can be prepared from a dicarboxylic acid and a diol, using the reactants in amounts such that the ratio OH/COOH is greater than 1 and preferably from 1.1 to 2.

Examples of suitable dicarboxylic acids include aliphatic acids such as succinic, glutaric, adipic, pimelic, suberic, azelaic, sebacic, maleic, fumaric, methyliminodiacetic and 3-dimethylamino-hexanedioic acid, cycloalkanedicarboxylic acids such as 1,4-cyclohexanedicarboxylic acid and 3-dimethylamino-1,2-cyclopentanedicarboxylic acid, aromatic diacids such as the phthalic acids and naphthalene-1,5-dicarboxylic acid, and pyrimidineor imidazoledicarboxylic acids.

Examples of suitable diols include 1,2-ethanediol, 1,2- and 1,3-propanediol, 1,2-, 2,3-, 1,3- and 1,4-butanediol, 1,5-pentanediol, 1,6-hexanediol, 1,10-decanediol, 2,2-dimethyl-1,3-propanediol, 2,2-diethyl-1,3-propanediol, butenediol, butynediol and ethyldiethanolamine. It is also possible to use, as diols, α,ω-dihydroxylic polyethers such as the poly(oxyalkylene)glycols mentioned below as illustrative polyethers.

Of course the hydroxylic polyester can be prepared from a mixture of diacids and/or a mixture of diols. It is also possible to use a mixture of diol and polyol containing 3 to 8 OH groups per molecule; this polyol can introduce up to, for example, 10% of the total number of —OH groups. This polyol can be, for example, trimethylolpropane, pentaerythritol, sucrose or sorbitol.

As regards the conditions under which the diacid/diol condensation can be carried out, reference may be made to "Polyesters", KORSHAK and VINOGRADOVA (Pergamon Press, 1965).

The α,ω-dihydroxylic-polyether may be, for example a poly(oxyalkylene)glycol, such as a poly(oxyethylene)glycol, a poly(oxypropylene)glycol, a copolymer with poly(oxyethylene) and poly(oxypropylene) blocks, a poly(oxytetramethylene)glycol obtained by polymerisation of tetrahydrofurane, a poly(oxybutylene)glycol obtained from 1,2-epoxy-butane and/or 2,3-epoxybutane, and a copolymer with blocks of ply(oxyethylene) and poly(oxybutylene) and, optionally, poly(oxypropylene). It is also possible to use polyethers containing nitrogen, prepared from ethylene oxide, propylene oxide and/or butylene oxide and a nitrogen-containing compound such as ethylenediamine, benzenesulphonamide, N-methyldiethanolamine or 2-amino-ethylethanolamine. Preferably, polyethers of molecular weight from 1,000 to 12,000 are used.

It is to be understood that the polyurethane can be derived from a single hydroxylic polymer or from a mixture containing several dihydroxyli copolymers such as those described above.

In the preparation of the polyurethane, a diisocyanate is used generally in an amount such that the ratio NCO/OH is greater than 1, preferably from 1.1 to 6.

The diisocyanate can, in particular, be: 1,6-diisocyanato-hexane, 2,4-diisocyanato-toluene, 2,6-diisocyanato-toluene, 1,3- and 1,4-diisocyanato-benzene, 2,2-bis-(4-isocyanato-cyclohexyl)-propane, bis-(4-isocyanatocyclohexyl)-methane, 1,5-diisocyanato-pentane, 1,4-diisocyanato-cyclohexane, bis-(4-isocyanato-phenyl)-methane, 2,2-bis-(4-isocyanato-phenyl)-propane, 1,5-diisocyanatonaphthalene, 3,3'-dimethyl-4,4'-diisocyanato-biphenyl or bis(3-methyl-4-isocyanato-phenyl)-methane.

It is of course possible to use a polyurethane prepared from a single diisocyanate or from a mixture of several diisocyanates. Furthermore, it is possible to use a small proportion, for example up to 10% of the total number of —NCO groups, of a compound containing from 3 to 8 —NCO groups per molecule.

The conditions for the reaction of the diisocyanate with the hydroxylic polymer are described in, for example, "Polyurethane Chemistry and Technology", J. H. SAUNDERS and K. C. FRISCH part 1, 1962.

The coupling agent is advantageously water, hydrazine, aminoacetic acid hydrazide, a diamine or a diol. If a diol is used, it can be a diol mentioned above in connection with the preparation of the polyester. It is also possible to use a mixture containing a diol and a compound containing 3 to 8 OH groups per molecule, such as one of those mentioned above.

If the coupling agent is a diamine the latter can be, for example, ethylenediamine, 1,2-diaminopropane, or, more generally, a diamine of the formula $NH_2 — E — NH_2$ in which E represents one of the radicals which A in formula (I) represents.

The use of a coupling agent in the preparation of a polyester-urethane and of a polyether-urethane is described, for example, in the abovementioned work by SAUNDERS, chapter VI, section IV. In general terms, the amount of coupling agent is chosen so as to react with all the free -NCO groups.

In the compositions according to the invention, the amounts of compound with imide groups (I) and of polyurethane (II) are preferably so chosen that the weight ratio II/I is from $\frac{1}{4}$ to 2/1.

The compositions according to the invention can be prepared by producing an intimate mixture of the compound with imide groups and of the polyurethane.

In order significantly to accelerate the curing of these compositions, it can be advantageous to incorporate into the compositions a compound which generates free radicals, such as an organic peroxide or a compound with azo groups such as those used for the crosslinking of the polyurethanes mentioned in, for example, U.S. Pat. No. 2,906,738. The proportion of this accelerator is generally from 0.5 to 5% of the weight of the composition.

Depending on the physical characteristics of the ingredients, the method of preparation can consist of applying the usual techniques for mixing finely divided solids, or of preparing a solution or a suspension of one of the constituents of the mixture in the other which is kept in the liquid state, optionally in a solvent such as cresol, dimethylformamide, N-methylpyrrolidone, dimethylacetamide, chlorobenzene or a mixture of solvents such as, for example, dimethylformamide and methyl ethyl ketone. Thereafter, the mixture can be heated for several minutes at a temperature of, for example, 50° C to 180° C to give a homogeneous liquid if the starting mixture contains a solid phase.

In addition to the compound with imide groups and the polyurethane, the compositions according to the invention can also contain, as an adjuvant, an aromatic compound (c), which possesses 2 to 4 benzene rings, is not sublimable at atmospheric pressure at up to 250° C. and has a boiling point of at least 250° C; the addition of these aromatic compounds makes it possible to prolong the period for which the composition can be used in the fused state. In these aromatic compounds (c), the benzene rings can form condensed nuclei or can be linked to one another by a valency bond or by an inert atom or group such as —O—, —CO— —CH$_2$—,

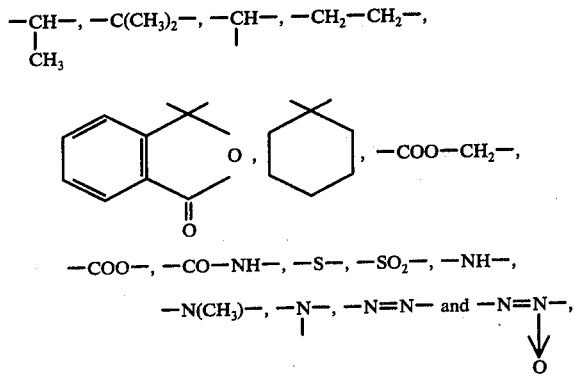

it being understood that in a given compound the overall way in which the rings are linked can be a combination of these different types of linkage. The benzene rings can be substituted by inert radicals such as —CH$_3$, —OCH$_3$, —F, —Cl and —NO$_2$. Amongst these compounds (c) there may, in particular, be mentioned the isomeric terphenyls, the chlorinated diphenyls, diphenyl ether, 2,2'-dinaphthyl ether, di-(o-methoxyphenyl) ether, benzophenone, 2,5,4'-trimethyl-benzophenone, p-phenylbenzophenone, p-fluorobenzophenone, azobenzene, 4,4'-dimethylazobenzene, azoxybenzene, diphenylmethane, 1,1-diphenyl-ethane, 1,1-diphenyl-propane, triphenylmethane, diphenylsulphone, diphenyl sulphide, 1,2-diphenylethane, p-diphenoxybenzene, 1,1-diphenyl-phthalene, 1,1-diphenyl-cyclohexane, phenyl benzoate, benzyl benzoate, p-nitrophenyl terephthalate and benzanilide. The compositions preferably contain up to 10% by weight of aromatic compound (c), which can be introduced at any time during the preparation of the compositions.

In the form of a homogeneous liquid, the compositions according to the invention can be used directly, for example for enamelling or impregnating conductors or producing moulded articles by simple casting, preferably hot casting. After the addition of a solvent, the compositions of this invention can also be used for the production of self-supporting films or of composite films, for example in combination with polyester or polyimide films; it is also possible to use the compositions for the manufacture of laminates, in which the fibrous skeleton can consist of woven or non-woven inorganic or organic fibres. It is also possible, after partial curing by heating, to employ the compositions in the form of powders, for example so as to obtain articles which are compression moulded or transfer moulded, for example for the potting of electronic components, these compositions having the advantage that they can be moulded equally well under low pressure, for example 5 to 20 bars, as under high pressure, for example up to 300 bars.

To produce moulded articles it is possible to incorporate fibrous or pulverulent fillers into the compositions. The moulded articles, as a general rule, have good flexural strength and good flexural modulus. They also have good resistance to heat distortion and good flame resistance.

The compositions of this invention can also be used as adhesives, with or without solvent; these adhesives can, in particular, be used for gluing a variety of substrates, especially metals such as aluminum, copper and steel, the adhesion of the compositions to metal substrates being remarkable, or for gluing terephthalate polyester films or polyimide or polyamide-imide films. The polyimide films can, in particular be derived from pyromellitic anhydride and an aromatic diamine; the polyamide-imide films can, in particular, be prepared from trimellitic anhydride and a diisocyanate.

The following Examples further illustrate the present invention.

EXAMPLE 1

50 g of a polyurethane elastomer obtained from 1 mol of a polyadipate of hexanediol and ethylene glycol (66/34 by weight) (molecular weight of the polyester: about 2,000), 5 mols of 4,4'-diisocyanatodiphenylmethane and 4 mols of 1,4-butanediol are dissolved in 186 ml of dimethylformamide in a one liter reactor, at 100° C.

Thereafter, 50 g of N,N'-4,4'-diphenylmethane-bis-maleimide and 1 g of dicumyl peroxide are added to this solution. The mixture is stirred at the same temperature for 3 hours 30 minutes.

Thereafter the solution is stirred into 3 liters of water, which are stirred vigorously, at 20° C, so as to precipitate the polymer obtained. The polymer is then carefully washed and dried in vacuo (1 mm Hg) at 60° C. This gives a coarse powder which softens at 135° C.

25 g of this powder are placed in a cylindrical mould of 75 mm diameter and 25 mm depth. The whole is placed between the platens of a press which has been preheated to 200° C, and a pressure of 200 bars is applied for 1 hour.

The article is then released from the mould and reheated at 200° C for 48 hours.

The moulded article is homogeneous and exhibits the following mechanical properties:

|  |  | Initial | After 1,000 hours at 180° C | After 3,000 hours at 180° C | After 5,000 hours at 180° C |
|---|---|---|---|---|---|
| Flexural strength kg/mm$^2$ | at 25° C | 6.2 | 8.5 | 11.15 | 8.62 |
|  | at 180° C | 1.1 | 3.1 | 3.6 | 1.8 |
| Flexural modulus kg/mm$^2$ | at 25° C | 78.1 | 135 | 222.5 | 258 |
|  | at 180° C | — | 48 | 92.7 | 150 |

The impact strength on an un-notched bar is 1 J/cm$^3$ (standard specification PT 51-017). The flame resistance of this material is good because it has a value of 30 on the LOI index scale (standard specification ASTM D 2863-70).

EXAMPLE 2

The preparation of the resin described in Example 1 is repeated, but using a polyurethane elastomer obtained from one mol of ethylene glycol polyadipate (molecular weight about 2,000), 4 mols of 4,4'-diisocyanatodiphenylmethane and 3 mols of 1,4-butanediol and reducing the reaction time to 2 hours. The resin obtained, which has a softening point of 120° C, is moulded under the conditions of Example 1.

The moulded article, reheated at 200° C for 48 hours, has a flexural strength of 6.0 kg/mm² measured at 25° C and of 1.2 kg/mm² measured at 180° C and a flexural modulus of 101 kg/mm² measured at 25° C and of 34.5 kg/mm² measured at 180° C.

EXAMPLE 3

A part of the resin obtained as described in Example 2 is placed in the cylindrical mould used previously. The whole is heated between the platens of a press which has been preheated to 170° C, and a pressure of 6 bars is applied for 1 hour.

The article released from the mould and reheated for 48 hours at 200° C exhibits the following mechanical properties:

A flexural strength of 6.3 kg/mm² measured at 25° C and of 1.1 kg/mm² measured at 180° C.

A flexural modulus of 93.5 kg/mm² measured at 25° C and of 21.4 kg/mm² measured at 180° C.

EXAMPLE 4

Example 2 is repeated, but using 0.25 g of dicumyl peroxide. The resin is employed under the conditions described in Example 1 (high pressure) and also under those described in Example 3 (low pressure).

The moulded articles exhibited the following mechanical properties:

| Properties | High pressure moulding | Low pressure moulding |
|---|---|---|
| Flexural strength (kg/mm²) at 25° C. | 5.31 | 5.50 |
| at 180° C. | 1.05 | 1.0 |
| Flexural modulus (kg/mm²) at 25° C. | 111.3 | 112.7 |
| at 180° C. | 27.8 | 16.7 |
| Impact strength, J/cm³ (un-notched bar) | 0.6 | 0.57 |

EXAMPLE 5

20 g of the polyurethane used in Example 2 are dissolved in 150 ml of dimethylformamide (DMF) at 100° C. Thereafter, 80 g of N,N',4,4'-diphenylmethane-bis-maleimide and 50 ml of DMF, as well as 0.30 g of dicumyl peroxide, are added to this solution. After 2 hours' reaction at 100° C, the resin is precipitated in 3 liters of water, washed and dried.

This resin is thereafter ground and moulded under the conditions described in Examples 1 and 3 (high pressure and low pressure) at a temperature of 170° C.

The moulded articles obtained, which are homogeneous and rigid, are reheated for 48 hours at 200° C and then exhibit the following properties:

| Properties | High pressure moulding | Low pressure moulding |
|---|---|---|
| Flexural strength (kg/mm²) at 25° C | 7.81 | 8.10 |
| at 180° C | 3.30 | 3.75 |
| at 250° C | — | 2.73 |
| Flexural modulus (kg/mm²) at 25° C | 321.9 | 292 |
| at 180° C | 195.1 | 155.5 |
| at 250° C | — | 140.4 |
| Impact strength, J/cm³ (un-notched bar) | 0.41 | 0.40 |

EXAMPLE 6

The preparation of the resin described in Example 2 is repeated, but in the absence of dicumyl peroxide.

The resin obtained is an excellent adhesive for gluing metals. Two sheets of stainless steel of sizes 100 × 25 × 1 mm are degreased with trichloroethylene and then treated for 20 minutes at 25° C in a mixture of 35% hydrochloric acid, 85% ortho-phosphoric acid and 60% hydrofluoric acid, in the ratio of 83.3/12.5/4.2 by volume. Thereafter, these sheets are washed with distilled water, dried at 100° C and preheated to 180° C.

The resin is then deposited over the width of the sheets and over a length of 13 mm at one of the ends of each sheet. The two sheets are left for 15 minutes at 180° C and are then applied against one another so that the faces covered with resin are superposed. A weight of 1 kg is placed on top and the assembly is left for 24 hours at 180° C.

After cooling, very good adhesion of the sheets is observed, characterised by a shear strength of 220 kg/cm² according to standard specification ASTM D 1002-64.

EXAMPLE 7

A part of the resin employed in Example 6 is dissolved in dimethylformamide so as to give a solution having a 70% resin concentration.

The steel sheets which have been cleaned in accordance with the process described in Example 6 are then coated over a part of their surface (25 × 13 mm) with the resin solution. The same procedure as in the preceding Example is then followed for the gluing. The shear strength is 160 kg/cm².

EXAMPLE 8

Example 6 is repeated, but using aluminium sheets of sizes 100 × 25 × 3 mm which have been treated for 13 minutes at 70° C with a mixture of water, sulphuric acid (density 1.84) and sodium bichromate in the ratio of 30/10/4 parts by volume. The shear strength is 178.5 kg/cm².

EXAMPLE 9

Two compositions based on the polymer prepared in Example 1 and filled with glass fibres are prepared by intimately mixing the following ingredients:

First composition: (by weight)
35 % of polymer powder obtained in Example 1 (softening point 135° C)
0.5 % of carbon black
64.5 % of 3 mm long glass fibre Second composition: (by weight)
70 % of polymer powder obtained according to Example 1
30 % of 6 mm long glass fibre Moulded articles are prepared from these compositions by applying the technique described in Example 1.

After a residence time of 1,000 hours at 200° C, these articles exhibit a flexural breaking strength, measured at 25° C, of 13.60 and 13.53 kg/mm² respectively for the two compositions.

EXAMPLE 10

A solution of the polymer prepared in Example 1 in N-methyl-pyrrolidone (40 g of polymer per 100 g of solution) is obtained by dissolving the polymer whilst stirring at ambient temperature.

A glass fabric (silionne-treated satin weave: 260 g/m²) is coated with this solution in three successive layers, each coating being followed by leaving the impregnated fabric in a ventilated oven at 130° C for 10 minutes.

After impregnation, the fabric is heated to 130° C for 30 minutes and a stack of 12 plies of pre-impregnated fabric is then prepared and is placed in a press, applying a pressure of 20 bars and raising the temperature from 25° C to 170° C in 1 hour. The stack is left at 170° C for 1 hour and the laminate obtained is then reheated for 72 hours at 200° C.

The laminated (A), which contains 35% of resin solids, is subjected to extended heat ageing at 200° C.

The variation in mechanical properties is shown in Table 1.

EXAMPLE 11

The preceding Example is repeated, using the resin prepared in Example 5.

The mechanical properties of the laminate (B) obtained are listed in Table 1.

The mechanical properties of this film B are shown in Table 2. The "crude film" given by way of comparison is an uncoated polyester film.

TABLE 2

| Duration in hours | | Aging at 180° C | | | Aging at 200° C | | |
|---|---|---|---|---|---|---|---|
| | | Crude film | Film A | Film B | Crude film | Film A | Film B |
| Initial values (kg/mm²) | A % | 160 | 158 | 158 | 160 | 158 | 158 |
| | R | 18.5 | 19.5 | 19.8 | 18.5 | 19.5 | 19.8 |
| 100 hours | A % | 22.7 | 50 | 53.6 | 1 | 11.5 | 27.8 |
| | R | 11.6 | 12.1 | 12.6 | 3.5 | 12.1 | 12.5 |
| 250 hours | A % | 0.8 | 11 | 10.3 | 0.5 | 2.5 | 4.6 |
| | R | 2.2 | 11.9 | 12.3 | 1.4 | 8.4 | 11 |
| 500 hours | A % | 0.2 | 1.88 | 3.15 | 0 | 1.2 | 2 |
| | R | 0.5 | 7.1 | 10 | 0 | 3.6 | 7.1 |
| 600 hours | A % | | | | 0 | 1 | 1.7 |
| | R | | | | 0 | 4.2 | 6.1 |
| 1,000 hours | A % | 0 | 0.6 | 1.66 | | | |
| | R | 0 | 2.3 | 6.5 | | | |

We claim:

1. A curable composition which consisting essentially of
A. an imide-group-containing compound chosen from the group consisting of:

TABLE 1

| Mechanical properties | Initial | | 1,000 hours at 200° C | | 3,000 hours at 200° C | | 5,000 hours at 200° C | |
|---|---|---|---|---|---|---|---|---|
| | B | A | B | A | B | A | B | A |
| Flexural strength kg/mm² at 25° C | 53.6 | 37.3 | 46.2 | 29.7 | 27.05 | 23.1 | 21.9 | 13.8 |
| at 200° C | 47.4 | 13.82 | 31.12 | 27.35 | 26.98 | 16.24 | 16.9 | 13.2 |
| Flexural modulus kg/mm² at 25° C | 2,090 | 1,213 | 2,018 | 1,369 | 1,967 | 1,520 | 1,623 | 1,039 |
| at 200° C | 1,994 | 830 | 1,818 | 1,334 | 15.64 | 932 | 1,417 | 982 |

EXAMPLE 12

A mixture composed of 50 g of granules of the polyurethane elastomer described in Example 1 and 50 g of N,N'-4,4'-diphenylmethane-bis-maleimide powder is introduced into a single-screw extruder which has a compression ratio of 3.5 and a speed of rotation of 30 revolutions per minute. The temperatures used are 158° C at the inlet, 200° C in the middle of the barrel of the extruder and 110° C at the die. The residence time of the material in the machine is 3 minutes.

At the die outlet, a homogeneous yellow strand is obtained, which is cut into granules. These granules are dissolved in dimethylformamide to give 40% concentration, the concentration being adjusted to 20% by adding butanone.

A polyester (poly(ethylene glycol terephthalate)) film is coated by simple immersion in the solution.

The coated film is dried in an oven at 200° C for about 5 minutes and is then subjected to a heat aging at 180° C and 200° C. The thickness of the coating is from 5 to 10 μ.

The elongation at break of the film (A%) and the tensile breaking strength (R in kg/mm²) are measured as a function of the residence time at 180° C and 200° C [standard specification ASTM D 882-56 T]. The values measured on this film A are shown in Table 2.

EXAMPLE 13

An analogous experiment to that of Example 12 is carried out using a resin prepared in accordance with the method of Example 1 but starting from 60 g of the polyurethane elastomer described in Example 1 and 40 g of N,N',4,4'-diphenylmethane-bis-maleimide.

a. a bis-imide of the formula:

$$D\begin{array}{c}CO\\ \\CO\end{array}N-A-N\begin{array}{c}CO\\ \\CO\end{array}D \quad (I)$$

in which D represents a radical chosen from the group consisting of the radicals of the formula:

[structural formulas]

in which Y represents H, CH₃ or Cl, m is 0 or 1, and A represents a divalent organic radical containing 2 to 30 carbon atoms, and b. a mixture comprising a bis-imide of formula (I) and a mono-imide of the formula:

$$D\begin{array}{c}CO\\ \\CO\end{array}N-R \quad (II)$$

in which D is as defined above and R represents a hydrogen atom or a monovalent organic radical containing from 1 to 20 carbon atoms; and B. a polyurethane elastomer, in amounts such that the weight ratio $$\frac{\text{polyurethane}}{\text{compound with imide groups}}$$

is from 1/5 to 4/1, and optionally

C. an aromatic compound which possesses 2 to 4 benzene rings, is not sublimable at atmospheric pressure at up to 250° C. and has a boiling point of at least 250° C.

2. A composition according to claim 1 in which the weight ratio $$\frac{\text{polyurethane}}{\text{compound with imide groups}}$$

is from 1/4 to 2/1.

3. A composition according to claim 1, in which the polyurethane is formed from a diisocyanate, a hydroxylic polymer and a coupling agent.

4. A composition according to claim 3, in which the hydroxylic polymer has a molecular weight of 1,000 to 12,000.

5. A composition according to claim 3 in which the ratio NCO/OH is from 1.1 to 6.

6. A composition according to claim 3, in which the coupling agent is water, hydrazine, aminoacetic acid hydrazide, a diamine or a diol.

7. A composition according to claim 1, in which A represents a phenylene or xylylene radical or two phenylene radicals linked by a valency bond or via —O—, —SO$_2$—, —S— or —CH$_2$—.

8. A composition according to claim 1 which also contains, as curing accelerator, a compound which generates free radicals.

9. A composition according to claim 8 in which the compound which generates free radicals is an organic peroxide.

10. A composition according to claim 8 in which the compound which generates free radicals is an azo compound.

11. A composition according to claim 1 in which the imide-group-containing compound is a mixture of a bis-imide of formula (I) and a monoimide of formula (II), the number of imide groups introduced by the mono-imide representing up to about 30% of the total number of imide groups introduced by the mixture.

* * * * *